United States Patent [19]
Clem

[11] Patent Number: 5,388,604
[45] Date of Patent: Feb. 14, 1995

[54] METHOD FOR ADJUSTING THE DENSITY OF A LIQUID

[75] Inventor: Lyle W. Clem, Algonquin, Ill.

[73] Assignee: Accurate Metering Systems, Inc., Schaumburg, Ill.

[21] Appl. No.: 210,380

[22] Filed: Mar. 18, 1994

Related U.S. Application Data

[62] Division of Ser. No. 95,665, Jul. 21, 1993, Pat. No. 5,325,852.

[51] Int. Cl.$^6$ ............................................. G05D 11/13
[52] U.S. Cl. .................................. 137/4; 137/91
[58] Field of Search ............ 137/4, 91, 101.19, 101.21

[56] References Cited

U.S. PATENT DOCUMENTS

| | | | |
|---|---|---|---|
| 1,449,458 | 3/1923 | Sutermeister . | |
| 2,131,510 | 9/1938 | Gray et al. . | |
| 2,530,981 | 11/1950 | Mikina . | |
| 3,036,585 | 5/1962 | Shawhan . | |
| 3,726,102 | 4/1973 | Parks . | |
| 3,823,571 | 7/1974 | Smith et al. . | |
| 4,176,672 | 12/1979 | Borberg . | |
| 4,234,007 | 11/1980 | Titone et al. | 137/101.19 |
| 4,277,254 | 7/1981 | Hanson | 137/101.19 X |
| 4,294,277 | 10/1981 | Szeliga | 137/101.19 |
| 4,420,008 | 12/1983 | Shu | 137/4 |
| 4,433,701 | 2/1984 | Cox et al. | 137/101.19 |
| 4,483,357 | 11/1984 | Rao et al. | 137/91 X |
| 4,487,062 | 12/1984 | Olin et al. . | |
| 4,654,802 | 3/1987 | Davis | 137/91 X |
| 4,747,272 | 5/1988 | Howell et al. | 137/101.21 X |
| 4,781,069 | 11/1988 | Mitzner . | |
| 4,879,911 | 11/1989 | Zolock . | |
| 4,911,020 | 3/1990 | Thompson . | |

FOREIGN PATENT DOCUMENTS

| | | | |
|---|---|---|---|
| 2046383 | 4/1972 | Germany | 137/91 |

*Primary Examiner*—Stephen M. Hepperle
*Attorney, Agent, or Firm*—Mathew R. P. Perrone, Jr.

[57] ABSTRACT

A density controlled product with controlled overrun amounts is formed a method and an apparatus whereby a fluid stream is measured with a mass flow meter in order to develop a predetermined liquid metering density control system for mixing a liquid having a variable density with an injected gas or liquid to derive a resultant liquid of a desired constant density may be obtained.

5 Claims, 5 Drawing Sheets $$\rho = [M]/[L]^3$$

FIG. 5

METHOD FOR ADJUSTING THE DENSITY OF A LIQUID

This application is a division of Ser. No. 08/095,665 filed on Jul. 21, 1993, now U.S. Pat. No. 5,325,852.

This invention relates to a method and apparatus for adjusting the density of a liquid, and more particularly to a method and apparatus whereby a fluid stream is measured with a mass flow meter in order to develop a predetermined liquid metering density control system for mixing liquids with an injected gas or liquid of variable density to derive a resultant liquid of a desired constant density.

BACKGROUND OF THE INVENTION

Adjusting the density of a liquid in a predictably repeatable fashion is a desired feature in many fields of manufacturing. Although this adjusting feature is not limited to the manufacture of foods, this adjustment of density is critically useful in the manufacture of foods, especially a food which is customarily sold and consumed while in a frozen state. Typical of such a frozen, consumable product is ice cream and similar products. The control of a fluid addition to the liquid is required in several processes to create a final liquid characteristic or hardenable liquid characteristic, which generally has a lesser density than the original fluid stream.

Foods, which are normally consumed in a frozen state, have a number of critical factors which must be met in order to make a suitable food. Such a food can become inedible due to high bite resistance. By high bite resistance is meant that a person cannot break off a piece of the product by biting the product.

In addition to producing a product with proper bite resistance, control of product composition and melt characteristics can result by establishing and maintaining consistent quality standards. But frozen products can vary widely in mix composition and freezing requirements. This problem leads to a need for repeatable mix ingredient assembly and control of variables of the freezing process to meet the individual product manufacturing criteria.

Conventional manufacturing plants must solve these seemingly contradictory problems. To do that, a plant needs to alter the process variables over a wide range, especially the freezing temperature and amount of air injected. Water ices and sherbets require substantially less air than bulk ice creams, while at the same time often having higher freezing temperatures.

Operating manufacturing plants require accurate and repeatable methods to alter and control the variables within their processes. This then creates a market for equipment and controls that accurately and repeatably address these methods. No apparatus exists to address these problems and methods.

A variety of approaches may be used to control this density factor. However, none of the procedures known in the prior art provide a method or apparatus capable of a controlled, constant testing or metering of density, in order to provide a reliably uniform product.

One method injects air into the liquid. The air volume is, however, dependant on the rate of the flowing liquid. There is no way of controlling the amount of air, while having the volume of air dependant on the flowing liquid.

As a recognition of the desire to have a sometimes variable amount of fluid added to the liquid, it is known to have a variable port for permitting the entry of the fluid such as air or other liquid into the steam. However, the rate of the gas addition is varied by outside intervention is not controlled based on readings from the flow of the liquid. This factor prevents the accurate control of density.

It is also known to determine the relative air or gas content of a product by comparing relative volumes in a sampling chamber with a compression system. The sample is compressed by a series of movable pistons. While this method can be used as a means of measuring the relative volume differences in the two samples, it cannot control the rate of gas addition nor can it operate as a quality control to continuously adjust the gas addition rate and achieve the desired density.

Another method involves using a volumetric, electromagnetic, flow meter in line with a control circuit to control addition of air to a liquid especially with using air mass flow control. This approach is based on a volumetric flow metering device and cannot compensate for variations in incoming fluid density by volumetric metering means. The liquid air ratio is controlled on a direct volume of liquid to volume of gas basis. This process cannot yield a liquid of desired density since temperature and mass of the liquid are not controlled.

Still another method of mixing a fluid with a liquid includes mixing a liquid component with another liquid component based on the volume measurements of a measuring device. With the adding of the liquid, this method permits the adding of one liquid to another to adjust the density of the resulting mixture. However, it still provides no reliable manner of determining and sustaining a desired density of the final liquid.

It is possible to add gas to a liquid stream based on maintaining a gas to liquid ratio by means of pressurizing the gas liquid mixture. The purpose of this idea is to create a carbonated beverage which contains gas to an approximate volume. The density of the resulting liquid may vary and does not create a basis for determining the amount of gas which is incorporated into the liquid or beverage, while achieving a desired density.

Furthermore, it is known to introduce air into the freezing chamber based upon a monitoring system for the loading of the dasher motor to maintain a constant desired product density. This continuous process alters the air intake by the indirect measurement means and cannot qualify as a control or quantifying device to a desired product density. Only external sampling means can be used to determine appropriate mechanism.

Thus, many problems still exist with adjusting the density of product by mixing and liquid and a fluid. This is especially true because no known apparatus uses a primary liquid metering device in combination with a computer controlled constant test of density.

The concept of overrun control requires a review of frozen product manufacturing and an understanding that without the injection of air or other gas, most frozen products become inedible due to high bite resistance. In other words, a person cannot break off a piece of the product by biting the product.

Freezing a dairy or food product often means causing a phase change in a solution, which may contain added solids or lipids or both. If water only is frozen, the resulting ice compound is difficult, if not impossible, to bite through or chew. Addition of solids; such as milk powders, sweeteners, or a similar food item used alone or in conjunction with lipids such as butterfat or vegetable oils; will cause the overall freezing point to be depressed below that of water. Depending on the composition of the mix, the normal freezing point may be depressed ten (10° F.) Fahrenheit degrees (five (5° C.) centigrade degrees) or more.

As temperatures are lowered during the freezing process the water begins to crystalize and bind the solids. Following homogenization, the fats and oils will become dispersed throughout the solution and will also become bound within the crystallization complex. This crystalline complex, like ice, is not easily consumed due to the high density of the resulting product.

If air or other edible gas mixture or a fluid is injected and evenly dispersed throughout the fluid mix during the freezing process small air cells result and the overall structure of the frozen product becomes very different. Each air cell tends to retain its structure surrounded by solids, fat globules, and water crystals. Variations in fat content, solids content, freezing temperature, freezing equipment, amount of air injected, and effectiveness of whipping the air/mix solution all have extremely high impact toward the final frozen product consistency and degree of consumer acceptance.

Overrun as a measurable variable in the manufacturing process is defined as the volume of product (such as ice cream) which results from the volume of mix frozen. This is often stated as a percentage and makes the assumption that the final product volume is greater than the volume of mix to give a positive percentage.

As stated previously, the variable amount of air depends not only on processing methods and mix composition, but also on the extent that consumer acceptance criteria; such as body, texture, bite resistance, taste, and appearance; are met. These factors along with legal standards of identity, addition of injected fruits or nuts, type of packaging, and type of marketing all contribute to establishment of overrun criteria for a given product.

A method for calculation of overrun on a volume basis is:

$$\frac{\text{Volume of ice Cream} - \text{Volume of Mix}}{\text{Volume of Mix}} \times 100 = \text{Percent Overrun}$$

Alternatively overrun (for a product such as ice cream) may be calculated on a weight basis as:

$$\frac{\text{Wt. per unit Vol. Mix} - \text{Wt. per unit Vol. Ice Cream}}{\text{Wt. per unit Vol. Ice Cream}} \times 100 = \text{percent overrun.}$$

The former method utilizing a volume based calculation is susceptible to interference from both formulation and temperature induced density variations. If the calculation is based on the volumetric measurement of mix and a volumetric determination of actual frozen product produced, then no input is made to reference a standard temperature of pressure and the resultant percentage may be affected by differences in the actual mixes being used. Present freezer equipment manufacturers are utilizing an electromagnetic flowmeter for volumetric measurement of fluid mix entering the freezer systems.

This method then becomes the basis for the overrun control and, as noted, cannot compensate for density variations in the fluid mix. Often the process methods will cause partially aerated and partially frozen product to be returned to the source tank which supplies the freezer in a way so as to prevent large losses of valuable product. This is especially prevalent during system start-up while temperatures are being adjusted and during shutdown or product change over. The result of this practice is to affect the ideal density of the source product and add air based upon volume which is not properly measured since the electromagnetic flowmeter provides an output of volume only, which does not compensate for density variation.

SUMMARY OF THE INVENTION

Among the many objectives of this invention is the provision of an apparatus, including a controlling mechanism for the addition of a gas or liquid to a flowing liquid of variable density to yield a flowing liquid of constant density.

Another objective of this invention is to yield information related to the flowing liquid which will determine a density compensated, volumetric rate of a flowing liquid.

Yet another objective of this invention is to provide an apparatus for determining the flow rate of a flowing liquid.

Still another objective of this invention is to provide an apparatus for determining the actual density of a flowing liquid.

Additionally, an objective of this invention is to provide an apparatus for displaying the information related to the density compensated, volumetricrate of a flowing liquid.

Also, an objective of this invention is to provide a means for altering the target density of the flowing liquid.

A further objective of this invention is to provide an apparatus which can measure the flowing liquids and flowing gases in a manner which will allow this apparatus to be utilized in highly sanitary applications involving fluids for oral consumption by a human.

A still further objective of this invention is to provide an apparatus which can measure flowing liquids and flowing gases in a manner which will allow this apparatus to be utilized in highly sanitary applications involving fluids for consumption by a human, parenterally.

Yet a further objective of this invention is to provide an apparatus for controlled, constant testing or metering of density, in order to provide a reliably uniform product.

Another objective of this invention is to provide an apparatus for good quality control.

Yet another objective of this invention is the provision of an apparatus to yield a flowing liquid of constant density to be formed into a frozen product.

Additionally an objective of this invention is the provision of an apparatus to yield a flowing liquid of constant density to be formed into an edible product.

Another objective of this invention is to yield information related to the flowing liquid which will determine a density compensated, volumetric rate of a flowing liquid.

Yet another objective of this invention is to provide a method for determining the flow rate of a flowing liquid.

Still another objective of this invention is to provide a method for determining the actual density of a flowing liquid.

Additionally, an objective of this invention is to provide a method for displaying the information related to the density compensated, volumetric rate of a flowing liquid.

Also, an objective of this invention is to provide a means for altering the target density of the flowing liquid.

A further objective of this invention is to provide an method which can measure the flowing liquids and flowing gases in a manner which will allow this method to be utilized in highly sanitary applications involving fluids for oral consumption by a human.

A still further objective of this invention is to provide an method which can measure flowing liquids and flowing gases in a manner which will allow this method to be utilized in highly sanitary applications involving fluids for consumption by a human, parenterally.

Yet a further objective of this invention is to provide an method for controlled, constant testing or metering of density, in order to provide a reliably uniform product.

Another objective of this invention is to provide an method for good quality control.

Yet another objective of this invention is the provision of an method to yield a flowing liquid of constant density to be formed into a frozen product.

Additionally an objective of this invention is the provision of an method to yield a flowing liquid of constant density to be formed into an edible product.

These and other objectives of the invention (which other objectives become clear by consideration of the specification, claims and drawings as a whole) are met by providing a method and an apparatus whereby a fluid stream is measured with a mass flow meter in order to develop a predetermined liquid metering density control system for mixing a liquid having a variable density with an injected gas or liquid to derive resultant liquid of a desired constant density.

BRIEF DESCRIPTION OF THE DRAWINGS

FIG. 5 is a description and definition of the term—density—as it relates to dimensions of mass and volume, where volume is further defined as a cubic dimension of length.

Throughout the figures of the drawings, where the same part appears in more than one figure of the drawings, the same number is applied thereto.

DESCRIPTION OF THE PREFERRED EMBODIMENTS

Figure 1:
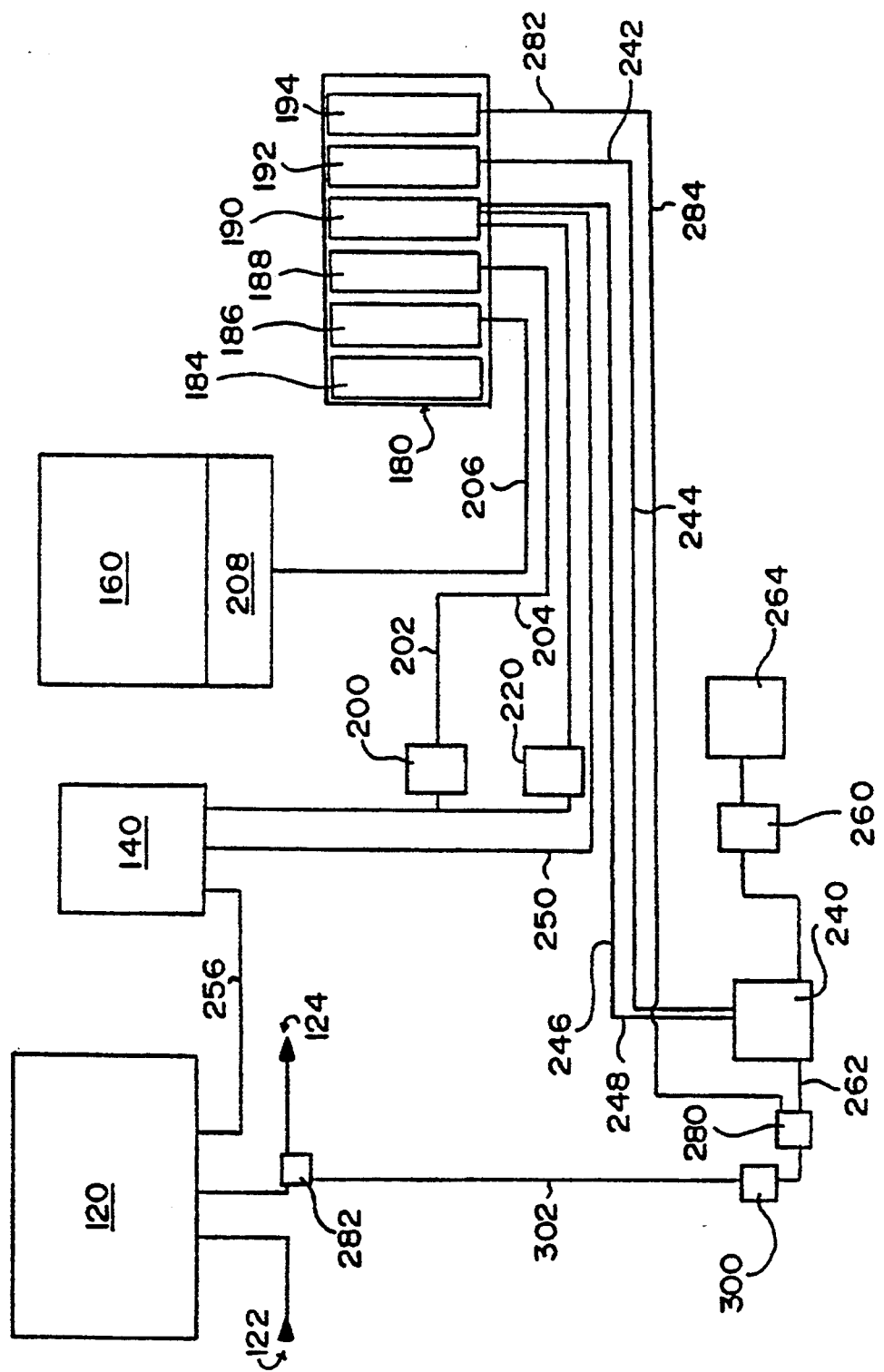
FIG. 1 is a block diagram indicating the control function and relationship of the liquid mass flowmeter, gas mass flowmeter/controller, programmable logic controller and operator interface.

The invention is directed to applications of a method and an apparatus, whereby a flowing liquid of variable density can be formed into a product having a predictable density. It is also desirable to control overrun at the same time.

Detection of the flow rate is measured by a liquid mass flowmeter. A typical flow rate meter for use herein is similar in construction to devices described by U.S. Pat. No. 4,879,911 to Michael J. Zolock; U.S. Pat. No. to Eric L. Mitzner 4,781,069; or U.S. Pat. No. to Duane D. Thompson 4,911,020. The devices described therein are capable of providing control signal outputs.

These signal outputs are indicative of the instantaneous density of the flowing liquid, indicative of the mass rate of the flowing liquid, and indicative of the volumetric flow rate of the flowing liquid as determined by a density compensated measurement which includes measurement of the liquids temperature to accomplish the density compensation.

The control signal outputs are available either as a linearized current loop signal or signals, or as a serially communicated value or values. The linearized current loop signal output or signal outputs are available either as linearized four (4 mA) milliamperes to twenty (20 mA) milliamperes current signals.

The liquid mass flowmeter linearized outputs relate a range of mass flow rate, in pounds mass or kilograms per minute, for a specific size meter, to a four (4 mA) milliamperes to twenty (20 mA) milliamperes current signal and further provides a second linearized output for density expressed as pounds mass or kilograms per unit volume to a four (4 mA) milliamperes to twenty (20 mA) milliamperes current signal. Each of these current signals are provided as inputs to a programmable logic device based upon a microprocessor capable of receiving the current signals and converting the analog current signals to digital type signals.

The liquid mass flowmeter may be installed in a piping system to measure the characteristics of a flowing liquid, by determining on a continuous basis, the instantaneous mass rate and density of the liquid. As it is also required by fluid processes to alter the density of a flowing liquid to a lesser density to create various products, the addition of a gas to the flowing liquid will result in a lesser density liquid to occupy a given volume.

The ability of the flowing liquid to entrain or otherwise hold the gas to maintain this lesser density depends on the specific fluid characteristics of the liquid. Natural permeability will allow absorption of some portion of a gas, but this level is limited to a relatively small density effect. Alteration of the flowing fluid to create a liquid/gas emulsion may be accomplished by mechanical agitation means or by maintaining a pressure sufficient to keep the gas entrained or by lowering the temperature of the fluid to a point where a phase change occurs to entrap the gas within a solid/gas matrix.

The gas mass flowmeter/controller is a device similar to units described in U.S. Pat. No. 4,487,062 to John G. Olin et al., which functions as a combination gas mass flowmeter and gas flow controller. This device is capable of providing a gas flow control function by receiving a linearized four (4 mA) milliamperes to twenty (20 mA) milliamperes signal from the programmable logic controller which is related to units of gas flow as Standard Liters per Minute. The variable gas flow stream is measured by an internal mechanism which heats a known cross section of the flow stream and monitors the heat dissipation into gas which is directly related to the mass flow of the gas through this section.

The heat dissipated within this cross sectional area may be extrapolated upward to relate to the entire cross section of the device will allow a determination of the mass of the flowing gas through the device. A control output is available from the gas mass flowmeter/controller which will be indicative of the actual mass of the gas which has passed through the device and is linearized to a known range over a four (4 mA) milliamperes to twenty (20 mA) milliamperes current signal which is further input to the programmable logic device.

The operator interface is used to display real time data from the liquid mass flowmeter and the gas mass flowmeter/ controller and as a means of selecting the desired setpoint for the density of the output flowing liquid. This interface continuously receives data from and transmits data to the programmable logic controller.

Numeric data may be entered with a keypad or similar device by operating personnel. Further, numeric data may be observed on a real time basis by means of a digital display capable of displaying alphanumeric characters.

Functionally, a setpoint for final flowing liquid density may be entered through the operator interface, which, in turn, communicates the setpoint to the computer or programmable logic controller. This setpoint density is compared to the actual variable density of the flowing liquid as determined by the mass flowmeter. It is a requirement for systems utilizing an additive stream of lesser density to yield flowing liquids of lesser density than the input flowing liquid density. The mathematical difference is then the required reduction of initial liquid density to yield a flowing liquid of known density.

The programmable logic controller determines the volume of gas required to be injected into the flowing liquid to yield a volume of flowing liquid of constant density. The volume as determined by the liquid mass flowmeter is determined as a density compensated volume and as such utilizes the functionality of the liquid mass flowmeter to consider the effects of temperature on the instantaneous density of a given volume. The volume of gas is similarly determined based upon a mass measurement method, again considering the effects of temperature.

An alternative method to yield a flowing liquid of constant density utilizes two liquid or fluid mass flowmeters and the same mathematical algorithm. This allows production of a flowing liquid of constant density where the resulting density is greater than the inflowing liquid through the addition of a flowing liquid whose variable density is always greater than the desired setpoint density.

The programmable logic controller determines the difference between required outflowing liquid density and the inflowing liquid density. Simultaneously a second liquid mass flowmeter on the additive stream of variable density liquid provides indication of the actual instantaneous density of the additive liquid.

The required volume of additive liquid to be mixed with the primary flowing liquid is controlled by means of flow control valve or alternatively a variable speed positive displacement pump or alternatively by means of a variable speed centrifugal pump. As the more dense additive stream is added, the programmable logic controller continuously updates the control mechanism to properly deliver the required volume and mass of additive liquid or fluid.

The apparatus described herein may be utilized within systems which produce liquids with a variety of end uses. The use of this apparatus to produce liquids for human use of either a consumable or non-consumable nature will require the selection of liquid/gas mass flowmeter constructed in such a manner as to be readily cleanable and sanitized of possible microbiological contamination.

Further, the use of this apparatus may be expanded to include a multiplicity of individually controlled streams of density controlled flowing liquids which utilize the programmable logic controller's capacity for functionality beyond a singular control function.

The AIR.RATE (Accurate Metering Systems, Inc. claims a trademark interest in that word) overrun control system utilizes an Accu-Mass mass flowmeter to provide process data for mass rate, in kilograms per minute (or pounds per minute) or fluid mix entering the freezing process and for density of this mix usually expressed in unit weight per unit weight per unit volume, kilograms per liter (or pounds per gallon). The mass rate output is in the form of a 4–20 mA current signal derived from a signal converter, which accepts a frequency signal from the Accu-Mass Flowmeter Transmitter and conditions the signal to the analog current, which is then connected to an analog input module of a programmable controller.

The density signal is derived from the same Accu-Mass flowmeter transmitter in a 4–20 mA format and is also connected to an analog input module of the programmable controller. Depending on the manufacturer of the programmable controller, as chosen by the end user, various forms of operator interface may be applied. The interface must allow for numerical data entry of the desired final product density (that is final product weight/unit volume).

Software programmed into the Programmable Controller will then calculate the required volume of air or gas to be injected to the fluid mix to give the desired final product density. This calculation is derived from the weight based approach and makes use of the data specifically available from the Accu-Mass Mass Flowmeter. This formula also generates a ratio which is multiplied by the density compensated volume to obtain a volume of required air for injection. This formula 30 may be stated as:

$$\frac{Q}{D} - 1 \times F = A$$

Q is the actual density of the mix (in kilograms per liter or pounds per gallon from the mass meter. F represents the volume of the fluid mix being density compensated from the mass meter. D represents the desired pounds per gallon or kilograms per liter prior to any additives. A represents the volume of air required in liters or gallons.

The volume of fluid mix above is determined by the mass meter which derives the volume from the density by its design. The result of this calculation is used as a setpoint for a Sierra Instruments Air Mass Flow Controller. This unit accepts a 4–20 mA setpoint signal from a programmable controller analog output module which is scaled to a calibrated range. This regulates an internal flow control mechanism to vary the rate of the air mass as being delivered to the freezing equipment. The air mass flow controller also provides a 4–20 mA output signal which indicates the actual amount of air mass rate which is being delivered.

Use of this signal will allow the programmable controller to verify delivery versus setpoint and to establish alarm conditions should the delivered amount differ from the setpoint by a user defined margin of error. The air mass flow controller requires a positive pressure differential in the range of 0.7 kilograms per square centimeter (10 pounds per square inch) to 3.5 kilograms per square centimeter (50 pounds per square inch) as compared to the downstream process pressures. More preferably, the differential is in the range of about 1.1 kilograms per square centimeter (about 15 pounds per square inch) to about 3.2 kilograms per square centimeter (about 45 pounds per square inch) as compared to the downstream process pressures. Most preferably, the differential is in the range of about 1.4 kilograms per square centimeter (about 20 pounds per square inch) to about 2.5 kilograms per square centimeter (about 35 pounds per square inch) as compared to the downstream process pressures. An especially preferred pressure is about 2.1 kilograms per square centimeter (about 30 pounds per square inch) as compared to the downstream process pressures.

This differential allows the air mass flow controller to internally divert a portion of the air into a laminar air flow section where the actual mass measurement occurs. This flow section is a known cross section of the main flow path which allows the controller to calculate the total air mass flow delivered by multiplying the actual measured portion by the ratio of the areas to arrive at a total mass flow value.

AIR.RATE (a trademark interest is claimed in this Accurate Metering Systems, Inc. of Schaumburg, Ill.) overrun control packages are configured with the above described equipment to control the air injection process for a single freezer barrel or scraped surface heat exchanger. Additional flow streams for additional barrels will require the addition of an flowmeter (such as an Accu-Mass flowmeter) and a flow controller per stream. The operator interface and programmable controller equipment may b configured to control multiple mix streams and air injection with the addition of appropriate input/output (I/O) modules.

In operation the apparatus for adjusting the density of a liquid includes a number of pieces of equipment. There is a liquid mass flow meter, a mass flow meter transmitter, an operator interface computer, a programmable logic controller, a frequency scaler, a frequency to analog converter, a gas mass flow meter controller, a filter regulator, a solenoid valve and a check valve. These items are connected appropriately to carry out the desired results of producing a predictable density for a liquid.

The programmable logic controller includes in its housing a programmable controller computer unit, an ASCII basic module, discrete input module, an analog input module and an analog output module, and a discrete output module. The discrete output module is connected by two standard control wires to the solenoid valve.

The analog output module is connected by two shielded cables to the gas flow meter controller. The analog input module is connected by two shielded cables to the gas flow meter controlled by two other shielded cables to the mass flow meter transmitter and by two other shielded cables to the frequency analog converter.

Two control wires connect the discrete input module to the frequency scaler. A communication cable connects the ASCII basic module to the operator interface keypad. The frequency scaler is also connected to the frequency analog convertor and the mass flow meter transmitter. The frequency analog convertor is connected to the mass flow meter transmitter. The flow meter transmitter communication cable connects the mass flow meter transmitter to the liquid mass flow meter.

Appropriate tubing connects the filter regulator on one end to a clean, dry, instrument gas supply and on the other end to the gas flow meter controller. Proceeding out of the gas flow meter controller is a tube connecting the gas flow meter controller to a solenoid valve. Between the solenoid valve and the gas injection point on the liquid mass flow meter is a check valve.

The liquid mass flow meter includes a liquid inlet for measuring the density of the incoming liquid. The outlet permits the liquid to flow thereout after the density has been tested. As the liquid flows out, gas is injected at the gas injection point through the piping from the check valve in order to achieve the liquid constant density. This particular structure and operation provides for a consistently repeatable density for the liquid.

Figure 4:
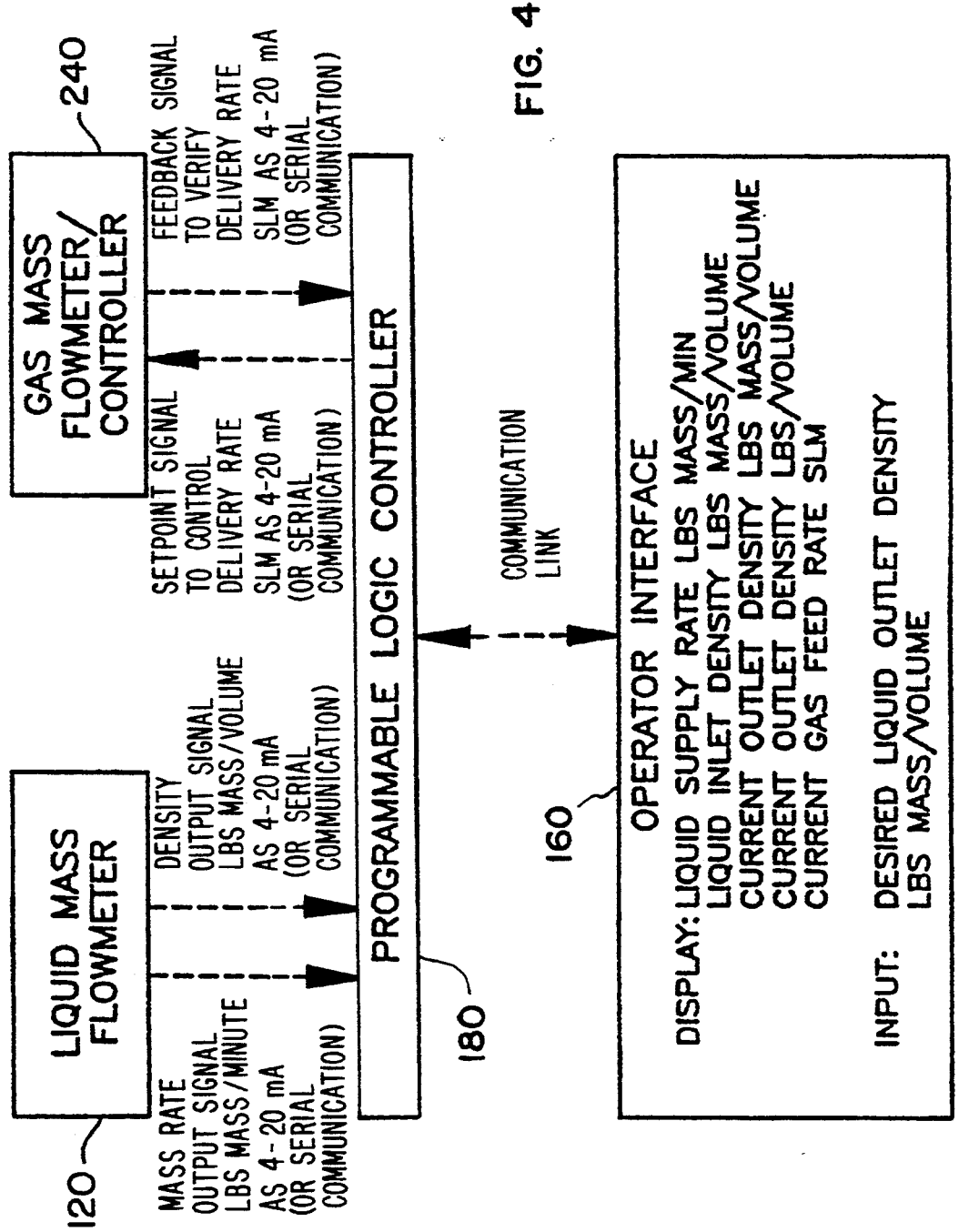
FIG. 4 is a block diagram of the interface between the computer, the operator and the coordinated flow meters.

Specifically referring to FIG. 1 and FIG. 4, the apparatus 100 for adjusting the density of a liquid includes a number of pieces of equipment. There is a liquid mass flow meter 120, a mass flow meter transmitter 140, an operator interface computer 160, a programmable logic controller 180, a frequency scaler 200, a frequency analog converter 220, a gas mass flow meter controller 240, a filter regulator 260, a solenoid valve 280 and a check valve 300. These items are connected appropriately to carry out the desired results of producing a predictable density for a liquid.

The liquid mass flow meter 120 is available from Micro-Motion Inc., of Boulder, Colo. Foxboro Inc. of Foxboro, Mass., or Krohne America, Inc. of Peabody, Mass., produce a product that is also operable. The gas flow meter 240 is available from Sierra Instruments, Inc., of Las Vegas, Nev. A similar device is available from the Brooks Instrument Division of Emerson Electric Company of Hatfield, Penn., or Teledyne Hastings-Raydist, Hampton, Va. The operator interface computer 160 is available from Eaton IDT, Inc. of Westerville, Ohio. Similar devices are available from Xycom Inc. of Saline, Mich. and Nematron Inc. of Ann Arbor, Mich.

The programmable logic controller 180 is available from Allen-Bradley of Milwaukee, Wis. Similar devices are available AEG Modicon, Inc. of North Andover, Mass., and the Square D Company of Palatine, Ill. The frequency scaler 200 is available from Action Instruments, Inc. Similar devices are available from Red Lion Controls of York, Penn., and Eaton Durante, Inc. of Whitewater, Wis. The frequency to analog converter 220 is available from Red Lion Controls. Similardevices are available from Newport Electronics, Inc. of Santa Ana, Calif., and Moore Industries, Inc. of Sepulveda, Calif.

The programmable logic controller 180 includes in its housing 182, a programmable controller computer unit 184, an ASCII basic module 186, discrete input module 188, an analog input module 190, an analog output module 192, and a discrete output module 194. The discrete output module 194 is connected by a first standard control wire 282 and a second standard control wire 284 to the solenoid valve 280.

The analog output module 192 is connected by a first shielded cable 242 and a second shielded cable 244 to the gas flow meter controller 240. The analog input module 190 is connected by a third shielded cable 246 and a fourth shielded cable 248 to the gas flow meter controller 240, and controlled by fifth shielded cable 250 and sixth shielded cable 252 connected to the mass flow meter controller 240 (transmitter) and to the frequency analog converter 220.

A first control wire 202 and second control wire 204 connect the discrete input module 194 to the frequency scaler 200. A communication cable 206 connects the ASCII basic module 286 to the operator interface keypad 208.

The frequency scaler 200 is also connected to the frequency analog convertor 220 and the mass flow meter transmitter 254. The frequency analog convertor 220 is connected to the mass flow meter transmitter 254. The flow meter transmitter 254 has a third communication cable 256, which connects the mass flow meter transmitter 254 to the liquid mass flow meter 120.

Appropriate tubing connects the filter regulator 260 on one end to a clean dry instrument gas supply 264 and on the other end to the gas flow meter controller 240. Proceeding out of the gas flow meter controller 240 is a first tube 262 connecting the gas flow meter controller 240 to the solenoid valve 280. Between the solenoid valve 280 and the gas injection point 282 on the liquid mass flow meter 120 is a check valve.

The liquid mass flow meter 120 includes a liquid inlet 122 for measuring the density of the incoming liquid. The outlet 124 permits the liquid to flow thereout after the density has been tested. As the liquid flows out, gas is injected at the gas injection point 282 through the piping 302 from the check valve 300 in order to achieve the liquid constant density. This particular structure and operation provides for a consistently repeatable density for the liquid.

Figure 2:
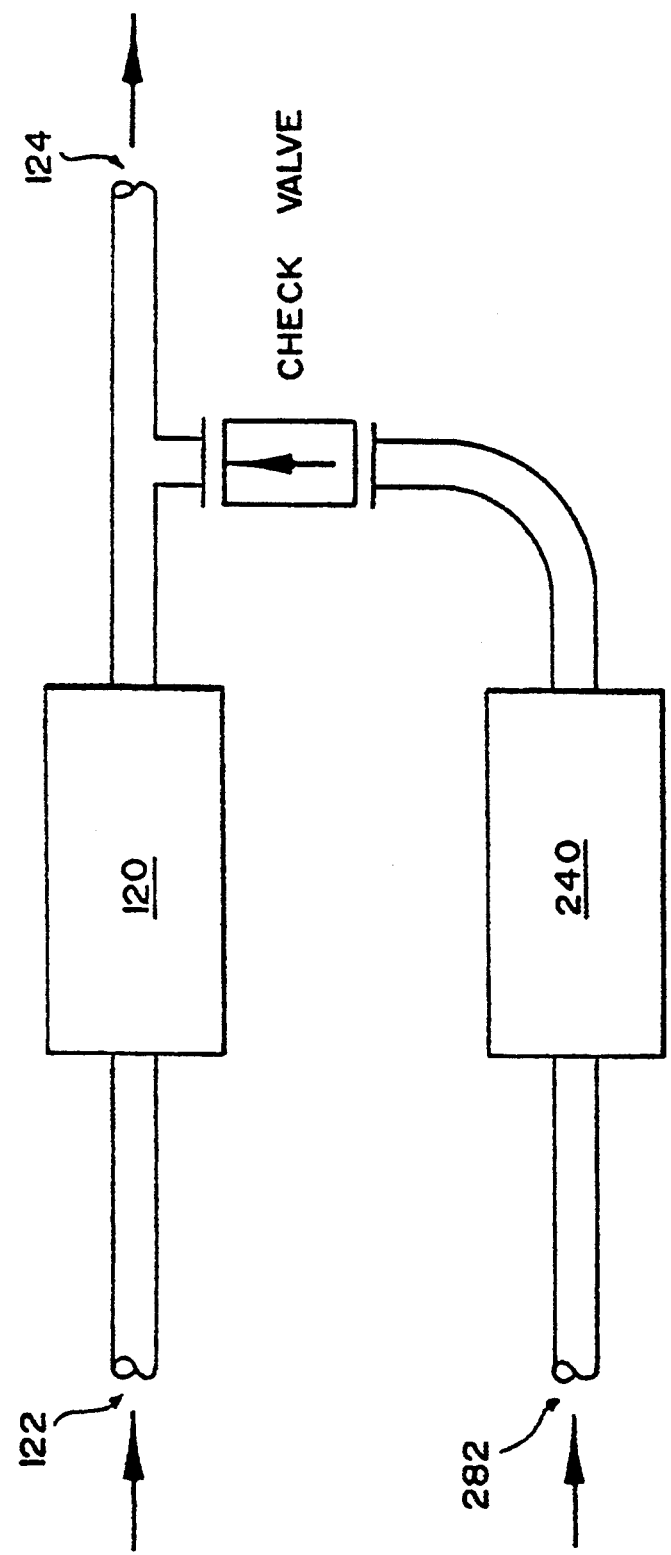
FIG. 2 is a schematic representation of the liquid flowmeter and gas mass flowmeter/controller indicating their arrangement within a piping system.

In FIG. 2, the liquid mass flow meter 120 and gas mass flow meter controller 240 are isolated for a more clear depiction of the control of gas injection into a liquid. The purpose thereof is to indicate their arrangement within a piping system including the apparatus 100 of this invention.

Figure 3:
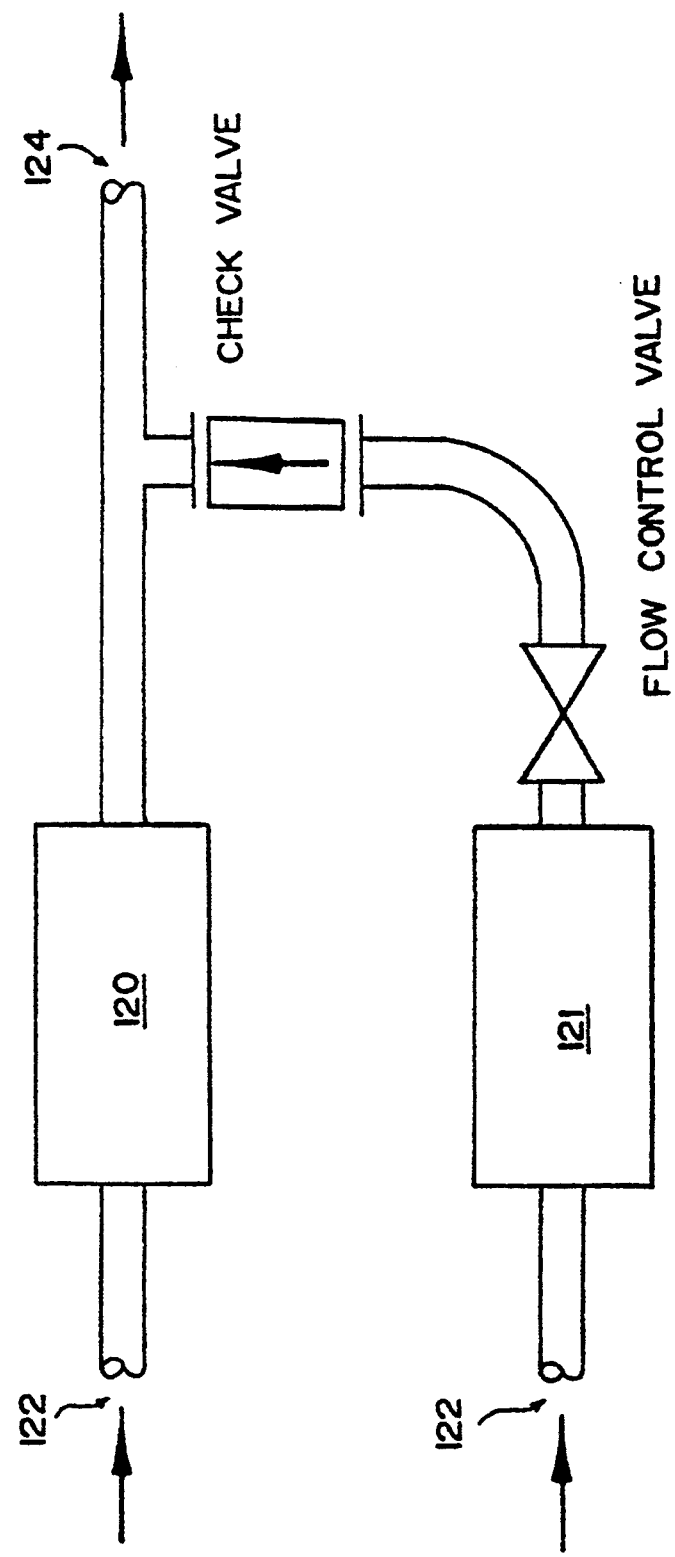
FIG. 3 is a schematic representation of a liquid mass flowmeter on both primary and additive flow streams indicating their arrangement within the piping system.

A modification of the apparatus 100 to permit mixing of two liquids to achieve a desired density is shown in FIG. 3. Depicted is a schematic representation of two of liquid mass flowmeter 120 on each of primary and additive flow streams indicating their arrangement within the piping system. Thus, it may be seen that an edible fluid can be mixed with edible liquid by apparatus 100 in order to achieve a food of desired density.

Figure 5:
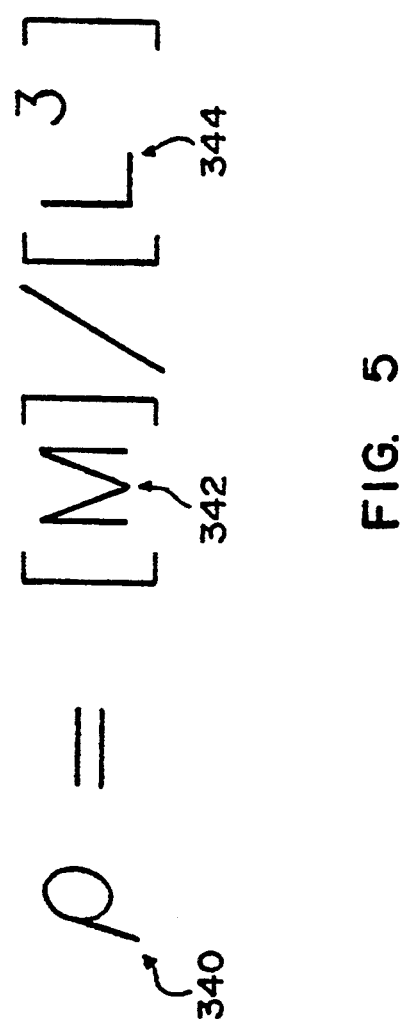

Referring now to FIG. 5, the formula for density is depicted as the Greek letter rho 340 in relation to mass and volume. Mass is depicted as M 342. Volume is depicted as a cubic dimension of length, L 344.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A method of producing a combined liquid comestible having a defined density comprising:
   a) determining a density of a first liquid;
   b) adding a sufficient amount of a fluid to the first liquid to form a combined liquid;
   c) determining the density of the combined fluid, the density of the combined fluid being less than the density of the first liquid;
   d) comparing the density of the combined fluid to a predetermined density;
   e) adjusting the amount of the fluid to have the density of the combined fluid approach the predetermined density;
   f) transferring data on the density of the first liquid to a programmable logic controller;
   g) passing the density of the first liquid from the programmable logic controller to a first mass flow meter;
   h) connecting a fluid supply for the fluid to a fluid mass flow meter;
   i) passing the fluid into the first liquid;
   j) reading the density of the combined fluid;
   k) transmitting the density of the combined fluid to the programmable logic controller;
   l) comparing the density of the combined liquid to the predetermined density;
   m) adjusting the fluid supply to bring the density of the combined liquid within the predetermined density; and
   n) recovering the combined liquid comestible.

2. The method of claim 1 further comprising:
   a) the fluid being a gas; and
   b) the first mass flow meter being a first gas flow meter.

3. The method of claim 1 further comprising:
   a) he fluid being a second liquid; and
   b) the first mass flow meter being a first liquid flow meter.

4. The method of claim 1 further comprising recovering the combined fluid as a frozen comestible.

5. The method of claim 1 further comprising recovering the combined fluid as a food.

* * * * *